P. HEINZ & W. A. GOEBEL.
KING BOLT CONNECTION FOR VEHICLES.
APPLICATION FILED JAN. 21, 1914.
1,134,267.
Patented Apr. 6, 1915.
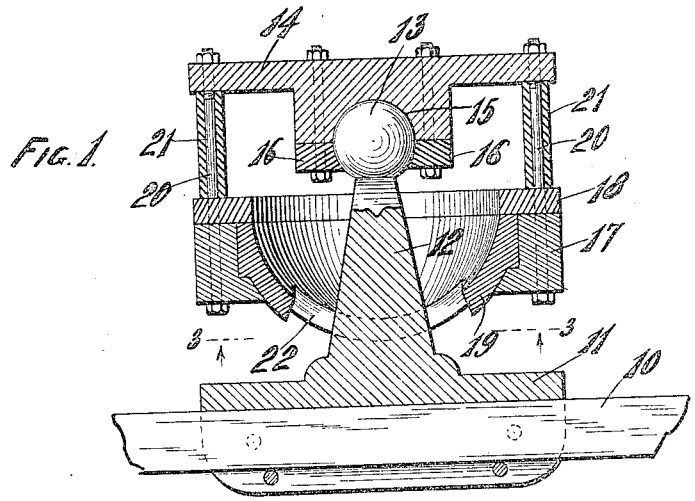
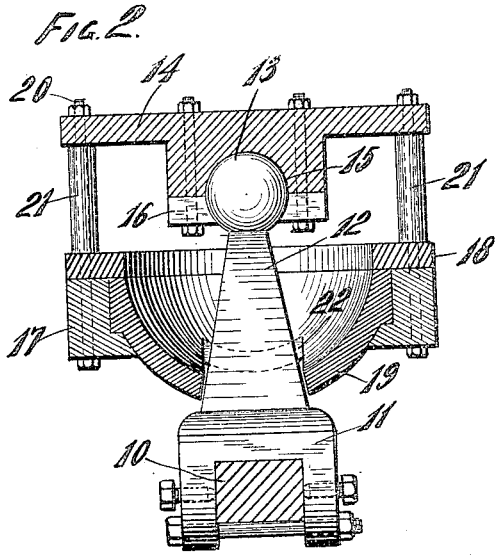
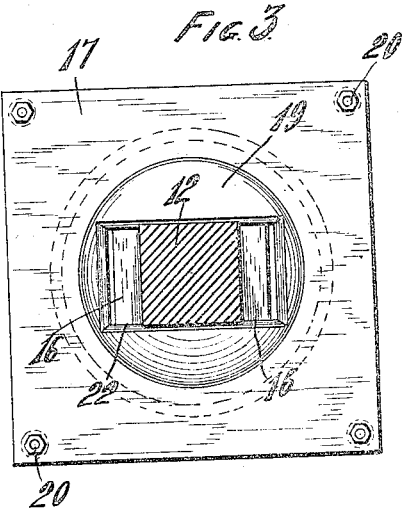

UNITED STATES PATENT OFFICE.

PAUL HEINZ AND WILLIAM A. GOEBEL, OF JANESVILLE, WISCONSIN.

KING-BOLT CONNECTION FOR VEHICLES.

1,134,267. Specification of Letters Patent. Patented Apr. 6, 1915.

Application filed January 21, 1914. Serial No. 813,607.

*To all whom it may concern:*

Be it known that we, PAUL HEINZ and WILLIAM A. GOEBEL, citizens of the United States of America, residing at Janesville, in the county of Rock and State of Wisconsin, have invented new and useful Improvements in King-Bolt Connections for Vehicles, of which the following is a description, reference being had to the accompanying drawings, which are a part of this specification.

The invention has for its object to provide a king bolt for heavy vehicles, such as grain separators, traction engines and the like, and which will freely permit of the tilting action of the axle, as when one front wheel passes over a higher portion of the road than the other, without allowing the front axle to move bodily in a forward or rearward direction, and this, without the use of braces or reaches.

The invention comprises a king bolt in the form of a post standing upwardly from the front axle and terminating in a spherical head which has a socket seat formed for it in the bolster plate, the movements of the post forwardly and rearwardly being prevented by a bowl-shaped guard that has a slot in its bottom through which the post extends, the walls of said slot fitting against the front and rear of the post so that the guard which is rotatably mounted turns with the post and the direction of the slot permitting of the oscillating movements of the post incident to the tilting of the axle when one front wheel travels higher than the other but preventing forward and rearward movement thereof.

With the above and other objects in view the invention consists in the king bolt connection for vehicles and the like as herein claimed and all equivalents.

Referring to the accompanying drawing in which like characters of reference indicate the same parts in the different views:

Figure 1 is a sectional front elevation of a king bolt constructed in accordance with this invention; Fig. 2 is a sectional side elevation thereof; and Fig. 3 is a sectional view on the plane of line 3—3 of Fig. 1, looking upwardly.

In these drawings 10 indicates a front axle of a vehicle which has firmly secured to it in any desired manner an axle clamp 11 carrying an upwardly extending vertical post 12 with a spherical head 13 at its upper end.

A bolster plate 14 of any suitable shape, according to the class of machinery with which it is used, and forming either a part of the frame of such machinery or connected therewith, has a socket 15 in the bottom thereof fitting upon the spherical head 13 of the pivot post, and a pair of retaining plates 16 bolted to the bottom of the socket by fitting against the head serve to prevent the withdrawal of the spherical head from the socket.

A flanged ring 17 with a flat ring 18 mounted thereon forms a seat or bearing for a bowl-shaped guide 19 and is securely clamped at a distance beneath the bolster plate 14 by means of bolts 20 connected therewith with spacing sleeves 21 surrounding the bolts between the bolster plate and the ring 18.

A rectangular slot or opening 22 in the bottom of the bowl-shaped guide 19 has the post 12 passing therethrough with the front and rear faces of the post fitting against the sides of the slot so as to prevent a forward or rearward movement of the axle, though the length of the slot permits of a tilting of the axle from side to side as when one wheel travels over a higher portion of the road than the other wheel. The fit of the front and rear surfaces of the post 12 in the slot 22 causes the bowl-shaped guide 19 to turn in its bearing in the rings 17 and 18 with the turning of the post, so that even when the front axle is turned at an angle to the body of the vehicle, as when the vehicle is turning a corner, the restriction of forward and rearward movement of the axle and the freedom of the axle to assume an inclination according to irregularities in the road surface continue as when the axle is in its normal position at right angles to the length of the vehicle.

The bowl-shaped guide 19 with its rectangular slot obviates the necessity for the use of braces or reach rods for retaining the axle in its proper position while freely permitting of the axle to turn and tilt as is necessary.

What we claim as new and desire to secure by Letters Patent is:

1. A king bolt connection for the front axles of vehicles, comprising a bolster plate having a bearing socket, a pivotal post adapted for connection with the axle and provided with a spherical head fitting in the socket, and a rotatably mounted slotted guide supported by the bolster plate and having the pivotal post passing through the slot thereof, the front and rear surfaces of the pivotal post fitting against the walls of the slot to cause the guide to turn therewith.

2. A king bolt connection for the front axles of vehicles, comprising a bolster plate having a socket, a pivotal post adapted for connection with the axle and provided with a spherical head fitting in the socket, a flanged ring secured to the bolster plate and spaced therefrom, a flat ring mounted on the flanged ring and forming a swivel seat therewith, and a flanged bowl-shaped guide having its flange fitting within the swivel seat and provided with a slot therethrough, said pivotal post having flat front and rear surfaces fitting against the sides of the slot of the guide whereby forward and rearward movements of the pivotal post are prevented, while pivotal movements from side to side, as well as turning movements, are permitted, the turning movements of the post causing the turning of the guide therewith.

PAUL HEINZ.
WILLIAM A. GOEBEL.

Witnesses:
ROBERT HEINZ,
L. BOURGMEYER.

Copies of this patent may be obtained for five cents each, by addressing the "Commissioner of Patents, Washington, D. C."